United States Patent [19]

Patil et al.

[11] Patent Number: 5,712,231
[45] Date of Patent: Jan. 27, 1998

[54] POLYMERS HAVING DIHYDROXY MOIETIES

[75] Inventors: Abhimanyu Onkar Patil, Westfield; Manuel Anthony Francisco, Washington, both of N.J.; Ken Lewtas, Wantage, United Kingdom; Howard Lih Fang, Bridgewater, N.J.

[73] Assignee: Exxon Research and Engineering Company, Florham Park, N.J.

[21] Appl. No.: 659,129

[22] Filed: Jun. 4, 1996

[51] Int. Cl.$^6$ .................... C10M 145/00; C07C 37/14
[52] U.S. Cl. .................... 508/587; 568/766
[58] Field of Search ................ 508/587; 568/766

[56] References Cited

U.S. PATENT DOCUMENTS

| | | | |
|---|---|---|---|
| 2,426,549 | 8/1947 | Coppock | 508/587 |
| 3,424,821 | 1/1969 | Hunter | 508/587 |
| 4,632,771 | 12/1986 | Liston et al. | 508/587 |
| 4,643,838 | 2/1987 | Liston et al. | 508/587 |
| 5,268,115 | 12/1993 | Gutierrez et al. | 508/587 |
| 5,334,775 | 8/1994 | Gutierrez et al. | 568/791 |
| 5,399,277 | 3/1995 | Patil | 44/427 |

Primary Examiner—Margaret Medley
Attorney, Agent, or Firm—Joseph J. Dvorak

[57] ABSTRACT

The present invention provides novel polymers comprising a plurality of dihydroxy aromatic moieties and at least one polyalkyl moiety. In one embodiment of the present invention, the polymer is formed from about 2 to about 50 interconnected dihydroxy aromatic moieties each having an attached polyalkyl moiety. In another embodiment of the present invention, the polymer is represented by the formula $A_xP_y$, where A is an aromatic dihydroxy moiety and P is a polyalkyl moiety. The polymers of the invention are useful as lubricating oil additives.

7 Claims, No Drawings

POLYMERS HAVING DIHYDROXY MOIETIES

FIELD OF THE INVENTION

The present invention relates to polymers useful as a lubricating oil additives. More particularly, the present invention is concerned with polymers having dihydroxy moieties.

BACKGROUND OF THE INVENTION

Monoalkyl catechols have been disclosed as having antioxidant and friction modifying properties when added to lubricating oil. See for example U.S. Pat. No. 4,632,771 and 4,643,838 and the references cited therein. In general, these alkyl catechols have alkyl groups of less than 24 carbon atoms.

Hydroxy aromatic compounds alkylated with an unsaturated olefin polymer having a number average molecular weight (Mn) of about five hundred have been reported to be useful precursors for the production of fuel and lubricant additives. See for example, U.S. Pat. No. 5,334,775.

The alkylation of hydroquinone with ethylene propylene copolymers produces products that have been disclosed as intermediates for making lubricating oil dispersants. See for example U.S. Pat. No. 5,399,277.

As useful as some of the foregoing compounds may be, the need still remains for improved lube additives. Thus, one object of the present invention is to provide novel polymers suitable as lube oil additives.

Also, as is known, lube oils and lube oil additives in an engine in the presence of $NO_x$ and oxygen forms sludge precursors and sludge. Thus, another object of the present invention is provide novel polymer additives which reduce lube oil sludge formation.

SUMMARY OF THE INVENTION

Accordingly, the present invention provides novel polymers comprising a plurality of dihydroxy aromatic moieties and at least one polyalkyl moiety.

In one embodiment of the present invention, the polymer is represented by the formula I:

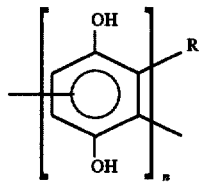

wherein R=a polyalkyl group and n is an integer from 2 to about 50.

In another embodiment of the present invention, the polymer is represented by formula II:

$A_xP_y$  II where A is an aromatic dihydroxy moiety having the formula (III):

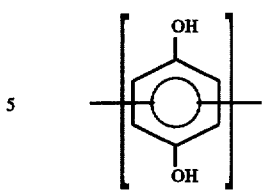

P is polyalkyl moiety, and x and y represent the mole percent of A and P in the polymer. Typically x will be in the range of from about 1 to 50 mole % and y from 50 to 99 mole %.

The polymers in the present invention are particularly useful as lubricating oil additives in reducing sludge formation in internal combustion engines.

DETAILED DESCRIPTION OF THE INVENTION

The novel polymers of the present invention comprise a plurality of dihydroxy aromatic moieties and at least one polyalkyl moiety. In the practice of the present invention, the polymer represented by the previously described formula I is prepared by polymerizing a polyalkyl substituted benzoquinone in the presence of an acid catalyst. The reaction scheme is illustrated by Equation 1 below.

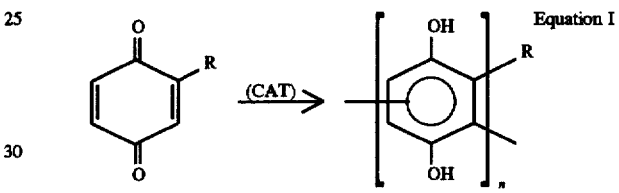

wherein R is a polyalkyl group and n is an integer from about 2 to about 50. The polyalkyl group, R, can be represented by the formula (IV)

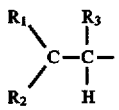

where at least one of $R_1$, $R_2$, and $R_3$ is a polymeric group and the remainder are hydrogen or hydrocarbon groups, polymeric or otherwise, the same or different. It is particularly preferred that the polyalkyl group, will have a number average molecular weight in the range of about 200 to about 10,000 and more preferrably in the range of about 200 to 5,000.

The polyalkyl substituted quinone used in forming the polymer of the present invention can be prepared by alkylating a hydroquinone with an ethylene alpha olefin copolymer, particularly an ethylene alpha copolymer having substantial terminal unsaturation, and then oxidizing the alkylated hydroquinone to the polyalkyl substituted quinone as illustrated in the examples which follow.

As indicated previously the polyalkyl substituted quinone is polymerized in the presence of an acid catalyst. Useful acid catalysts include acidic resins such as those sold by Rohm & Haas, Philadelphia, Pa. under the tradename Amberlyst, sulfuric acids, trifluoromethane surfonic acid, and Lewis acids such as $AlCl_3$ and the like.

In general, the reaction is carried out in a solvent such as methylene chloride, nitromethane and oils such as S100N and S150N. Typical temperature for reaction range between about 20° C. to about 60° C. Also, the reaction is generally conducted for about 24 hours up to about 1 week.

In another embodiment of the present invention, a polymer having the previously described formula II, $A_xP_y$, is prepared by reacting an ethylene alpha olefin copolymer having substantial terminal unsaturation and typically having a number average molecular weight in the range of 200 to 10,000 with benzoquinone in the presence of an acid catalyst. The reaction is illustrated by Equation 2 that follows.

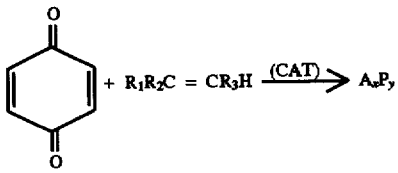

Equation 2

In Equation 2, $R_1$, $R_2$, and $R_3$ are previously described in connection with formula IV.

In carrying out the above reaction, the same catalysts, solvents, temperatures and time described in connection with the reaction of Equation 1 may be employed.

The polymers of the present invention are particularly suited for use as lube oil additives because of their ability to reduce sludge formation that occurs in engine oils under conditions of use. Thus, one embodiment of the present invention comprises a formulated lube oil composition comprising a major portion of an oil of a lubricating viscosity and a minor portion of the polymer comprising a plurality of dihydroxy aromatic moieties and at least one polyalkyl moiety. It is particularly preferred that the amount of the polymer present in the lube oil will be an amount sufficient to mitigate the sludge formation. The ranges of the polymer that typically will be useful in lube oils will be in the range of about 0.01 to 30 weight percent based on the total weight of the lube oil and preferrably 0.1 to 8 wt. %.

The following examples are offered to specifically illustrate the invention and are not to be construed as limiting the scope thereof.

EXAMPLES

Example 1: Alkylation of ethylene propylene copolymer with hydroquinone

In a 250 ml round-bottom flask were charged 6.38 g. (0.058 moles) of hydroquinone (mw=110) and 50 ml of heptane. To this was added 14.5 g. of Amberlyst-15 (a divinyl benzene-polystyrene sulfuric acid resin sold by Rohm and Haas, Philadelphia, Pa.) and a mixture was heated to 90° C. Added to this was 50 g. of an ethylene propylene (hereinafter EP) polymer (mw=870) and the solution was maintained at 90° C. for another 2.5 hours. The reaction mixture was then filtered, the filtrate evaporated, and the resultant product redissovled in heptane. The heptane solution was itself filtered and the filtrate evaporated under vacuum to obtain the product.

IR spectra of the product revealed new peaks appearing at 3600 and 1400 $cm^{-1}$ (thereby indicating a change in the nature of the hydroxyl groups on the aromatic ring that would indicate the presence of a substituent thereon) and complete disappearance of the double bond peaks of the EP polymer at 3065, 1645 and 885 $cm^{-1}$ (thereby indicating the loss of the polymer unsaturation). This indicates that the dihydroxyaromatic was successfully alkylated.

Example 2: Oxidation of ethylene propylene copolymer-hydroquinone adducts to ethylene propylene and copolymer-benzoquinone adducts 10 g of the product of example 1 was charged into 100 ml flask and air was bubbled through the sample for one week. FTIR spectrum of the product shows almost disappearance of the alkylated hydroquinone peak at 3620 $cm^{-1}$ and new peak appeared at 1655 $cm^{-1}$ due to alkylated quinone. This indicates that the dihydroxyaromatic was oxidized to the ethylene propylene-benzoquinone adduct.

Exampel 3: Polymerization of ethylene propylene copolymer-benzoquinone adducts

In a 100 ml three neck round-bottom flask were charged 18.0 g of the product of example 2 along with 50 ml methylene chloride under nitrogen. To this solution was added 3 ml of concentrated sulfuric acid at room temperature under nitrogen. The orange solution changed to dark green on addition of the sulfuric acid solution. The solution was allowed to stir at room temperature for 5 days. After 5 days sitirring was stopped and methylene chloride was removed by nitrogen stripping. The thick product was rinsed with water (100 ml) to remove excess sulfuric acid and then with acetone to remove water. The product was dried under vacuum. FTIR spectrum of the product shows hydroxyl peak at 3425 and 1655 $cm^{-1}$.

Example 4: Copolymerization of ethylene propylene copolymer and benzoquinone

In a 100 ml three neck round-bottom flask were charged 10.0 g of an ethylene propylene copolymer (Mn=870), 1 g benzoquinone and 50 ml of nitromethane under nitrogen. The solution was stirred under nitrogen and 1 ml of concentrated sulfuric acid was added slowly at room temperature under nitrogen. The solution was allowed to stir at room temperature for 48 hours. After 48 hours stirring was stopped and nitromethane solvent was removed by nitrogen stripping. The thick product was stirred with 500 ml methanol and methanol was decanted. The product was dried under vacuum. FTIR spectrum of the product shows hydroxyl peak at 3420 and 1650 $cm^{-1}$.

Example 8: Nitration Studies

The reaction of $NO_x$ with unburned gasoline components plays an important role in the formation of low temperature sludge. The sludge formation is believed to be caused by incorporation of $NO_x$ into oil, fuel and additives mixture. This incorporation leads to the formation of high polarity nitration species ($RONO_2$ and $RNO_2$) which became insoluble in the base oil and precipitates. Nitration species may also participate in radical degradation and/or condensation chemistry to form sludge precursors.

AntiNOxidant evaluation

The bench deposit tests were conducted using myrcene as a model fuel component added to S150N. $NO_x$ is bubbled through the mixture at 95° C. for 2 hours to simulate low temperature engine conditions. The formation of organic nitrate and nitro species as well as the build up of carbonyl species were measured periodically using infrared spectroscopy. The base case is olefins/dienes with $NO_x$ in S150N with no additives. Sludge generated in the test is filtered, dried and weighed. IR spectra of the reaction mixture taken as a function of time shows that $NO_x$ participates in the reaction and is responsible for the precipitate formation.

The products of the example 3 and 4 were evaluated in the $NO_x$ test discussed above. The $NO_x$ performance data compared with the base case and are shown in Table 1.

TABLE 1

| AntiNOxidant Performance | |
|---|---|
| Additive | Sludge Wt. (g) |
| Base Case (S150N) | 1.81 |
| Example 3 | 0.27 |
| Example 4 | 0.60 |

These data clearly show that, when the test is conducted with small amounts of additive of example 3 and 4, precipitate formation is substantially reduced compared to the base case showing that these additives are very effective anti NOxidant additives.

What is claimed is:

1. A polymer comprising a plurality of dihydroxy aromatic moieties and a polyalkyl moiety having a number average molecular weight ranging from about 200 to about 10,000, wherein the polymer has the formula

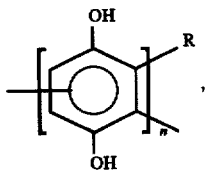

R is a polyalkyl group, and n is an integer ranging from about 2 to about 50.

2. A lubricating composition comprising a major portion of oil of lubricating viscosity and a minor portion of an additive polymer comprising a plurality of dihydroxy aromatic moieties and a polyalkyl moiety, wherein the polymer has the formula

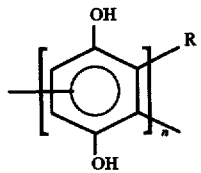

R is a polyalkyl group, and n is an integer ranging from about 2 to about 50.

3. A polymer represented by the formula:

$A_xP_y$ where A is an aromatic dihydroxy moiety having the formula

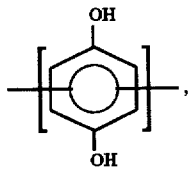

P is a polyalkyl moiety having a number average molecular weight ranging from about 200 to about 10,000, x ranges from about 1 to about 50 mole %, and y ranges from about 50 to about 99 mole % of the polymer.

4. A lubricating composition comprising a major portion of oil of lubricating viscosity and a minor portion of an addition polymer represented by the formula $A_xP_y$ where A is an aromatic dihydroxy moiety having the formula

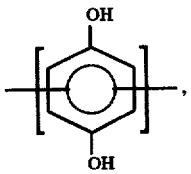

P is a polyalkyl moiety having a number averge molecular weight ranging from about 200 to about 10,000, x ranges from about 1 to about 50 mole %, and y ranges from about 50 to about 99 mole % of the polymer.

5. A method for preparing a polymer having a plurality of dihydroxy aromatic moieties comprising:

alkylating a hydroquinone with an ethylene alpha olefin copolymer and then oxidizing the alkylated hydroquinone thereby forming a polyalkyl substituted benzoquinone, contacting the polyalkyl substituted benzoquinone with an acid catalyst in a solvent at a temperature in the range of about 20° C. to about 60° C. for a time sufficient to polymerize the polyalkyl substituted benzoquinone thereby preparing the polymer.

6. A method for preparing a polymer having a plurality of dihydroxy aromatic moieties comprising:

contacting an ethylene alpha olefin copolymer and benzoquinone with an acid catalyst in a solvent at a temperature ranging from about 20° C. to about 60° C. for a time sufficient to polymerize the ethylene alpha olefin copolymer and the benzoquinone thereby preparing the polymer.

7. The composition of claims 2 or 4 wherein the additive is present in an amount ranging between about 0.01 wt. % to about 30 wt. % based on the weight of the oil.

* * * * *